(12) United States Patent
Griswold et al.

(10) Patent No.: US 12,459,311 B2
(45) Date of Patent: Nov. 4, 2025

(54) DEVICES AND METHODS FOR OVERLOADING PROTECTION OF PIEZOELECTRIC MATERIAL MOUNTED ON WHEELS

(71) Applicant: TDK CORPORATION, Tokyo (JP)

(72) Inventors: Ryan Griswold, San Jose, CA (US); Vibhu Vivek, San Jose, CA (US)

(73) Assignee: TDK CORPORATION, Tokyo (JP)

( * ) Notice: Subject to any disclaimer, the term of this patent is extended or adjusted under 35 U.S.C. 154(b) by 265 days.

(21) Appl. No.: 17/973,820

(22) Filed: Oct. 26, 2022

(65) Prior Publication Data
US 2023/0133090 A1 May 4, 2023

Related U.S. Application Data

(60) Provisional application No. 63/273,907, filed on Oct. 30, 2021.

(51) Int. Cl.
| | |
|---|---|
| *B60C 23/04* | (2006.01) |
| *B60C 23/06* | (2006.01) |
| *G01L 17/00* | (2006.01) |
| *H10N 30/30* | (2023.01) |
| *G01M 1/22* | (2006.01) |

(52) U.S. Cl.
CPC ........ *B60C 23/0486* (2013.01); *B60C 23/064* (2013.01); *G01L 17/00* (2013.01); *H10N 30/30* (2023.02); *H10N 30/302* (2023.02); *G01M 1/225* (2013.01)

(58) Field of Classification Search
CPC ... B60C 23/0486; B60C 23/064; G01L 17/00; H10N 30/30; H10N 30/302
See application file for complete search history.

(56) References Cited

U.S. PATENT DOCUMENTS

| | | | |
|---|---|---|---|
| 6,339,956 B1 | 1/2002 | Huinink et al. | |
| 8,051,705 B2 * | 11/2011 | Kobayakawa | G01B 7/16 73/146 |

(Continued)

FOREIGN PATENT DOCUMENTS

| | | | | |
|---|---|---|---|---|
| DE | 102010019725 A1 * | 6/2011 | ......... | B60C 23/0411 |
| EP | 2186657 A1 | 5/2010 | | |

OTHER PUBLICATIONS

Extended European Search Report issued in related European Patent Application No. 22207708.3 dated Apr. 4, 2023.

*Primary Examiner* — Jill E Culler
(74) *Attorney, Agent, or Firm* — Morgan, Lewis & Bockius LLP

(57) ABSTRACT

Sensor modules mountable on a wheel are described. A sensor module mountable adjacent to a rim of a wheel includes a first set of one or more piezoelectric sensors; and a first elastic support with the first set of one or more piezoelectric sensors coupled thereon so that the first set of one or more piezoelectric sensors are spaced apart from the rim of the wheel. A wheel that includes a rim and the sensor module is also disclosed. A method includes receiving a force on a tire mounted on a rim of a wheel. The tire is in contact with an elastic support with one or more piezoelectric sensors coupled thereon so that the force causes strain in the elastic support and the one or more piezoelectrical sensors. The method also includes, in response to receiving the force, generating electrical signals from the one or more piezoelectric sensors.

19 Claims, 11 Drawing Sheets

(56) References Cited

U.S. PATENT DOCUMENTS

| | | | |
|---|---|---|---|
| 10,232,674 B2* | 3/2019 | Genmei | B60C 23/064 |
| 11,097,577 B2* | 8/2021 | Skjermo | B60C 23/0411 |
| 2010/0256946 A1* | 10/2010 | Carresjo | B60C 23/0474 |
| | | | 702/138 |
| 2010/0274607 A1 | 10/2010 | Carresjo et al. | |
| 2011/0308683 A1 | 12/2011 | Crano | |
| 2020/0049581 A1 | 2/2020 | Thornham et al. | |
| 2021/0028725 A1* | 1/2021 | Griswold | B60C 23/0486 |
| 2021/0273153 A1* | 9/2021 | Fudo | G01B 7/16 |
| 2022/0321032 A1* | 10/2022 | Griswold | B62J 45/42 |

\* cited by examiner

910 Receive a force on a tire mounted on a rim of a wheel. The tire is in contact with an elastic support with one or more piezoelectric sensors coupled thereon so that the force causes strain in the elastic support and the one or more piezoelectrical sensors.

920 In response to receiving the force, generate electrical signals from the one or more piezoelectric sensors

930 Determine a driving condition of the wheel based on the electrical signals generated from the one or more piezoelectric sensors

FIG. 9

DEVICES AND METHODS FOR OVERLOADING PROTECTION OF PIEZOELECTRIC MATERIAL MOUNTED ON WHEELS

PRIORITY AND RELATED APPLICATIONS

This application claims priority to U.S. Provisional Patent Application No. 63/273,907, filed Oct. 30, 2021, entitled "Devices and Methods for Overloading Protection of Piezoelectric Material Mounted on Wheels," which is incorporated by reference herein in its entirety.

TECHNICAL FIELD

This application relates generally to energy harvesters and strain sensors, and more particularly to energy harvesters and strain sensors with piezoelectric materials.

BACKGROUND

Advances in distributed sensor networks have improved the safety and performance of various systems, which has led to a greater demand for advanced sensing applications to complement existing systems.

SUMMARY

Such demand has led to measurements of temperature, pressure, acceleration, and forces (static and dynamic) exerted on tires, wheels, and vehicles. Some of these sensors include a piezoelectric material, which may be used to detect mechanical strain or deformation. For example, a sensor with the piezoelectric material may provide electrical signals that contain information about the movement and/or deformation of a portion of an object (e.g., tire, wheel, vehicle, etc.) onto which the sensor is mounted. However, overloading (application of a stress above a certain threshold) of the piezoelectric material may cause excessive strain in the piezoelectric material, which can lead to damages (e.g., formation of cracks) to the piezoelectric material.

The devices and methods described herein address challenges associated with conventional devices with piezoelectric materials. A piezoelectric sensor is coupled with an elastic support, which reduces overloading of the piezoelectric sensor. In some configurations, the elastic support has a loop or hoop structure. In some implementations, the piezoelectric sensor may be used also as an energy-harvesting device (e.g., an electrical power generator that converts kinetic, thermal, optical, and mechanical energy available from a vehicle, such as rotation, acceleration, deceleration, and/or vibration, of the wheels, into electrical energy). Such energy-harvesting devices may replace conventional energy storage devices or, when used in conjunction, prolong the life expectancy of such energy storage devices.

In accordance with some embodiments, a sensor module mountable adjacent to a rim of a wheel includes a first set of one or more piezoelectric sensors; and a first elastic support with the first set of one or more piezoelectric sensors coupled thereon so that the first set of one or more piezoelectric sensors are spaced apart from the rim of the wheel.

In accordance with some embodiments, a wheel includes a rim and any sensor module described herein.

In accordance with some embodiments, a method includes receiving a force on a tire mounted on a rim of a wheel. The tire is in contact with an elastic support with one or more piezoelectric sensors coupled thereon so that the force causes strain in the elastic support and the one or more piezoelectrical sensors. The method also includes, in response to receiving the force, generating electrical signals from the one or more piezoelectric sensors.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 9 is a flow diagram illustrating a method of generating electrical signals with one or more piezoelectric sensors coupled on an elastic support, in accordance with some embodiments.

DESCRIPTION OF EMBODIMENTS

Reference will be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these particular details. In other instances, methods, procedures, components, circuits, and networks that are well-known to those of ordinary skill in the art are not described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first end could be termed a second end, and, similarly, a second end could be termed a first end, without departing from the scope of the various described embodiments. The first end and the second end are both ends, but they are not the same end. Similarly, a first elastic support could be termed a second elastic support, and, similarly, a second elastic support could be termed a first elastic support, without departing from the scope of the various described embodiments. The first elastic support and the second elastic support are both elastic supports, but they are not the same elastic support.

The terminology used in the description of the embodiments herein is for the purpose of describing particular embodiments only and is not intended to be limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
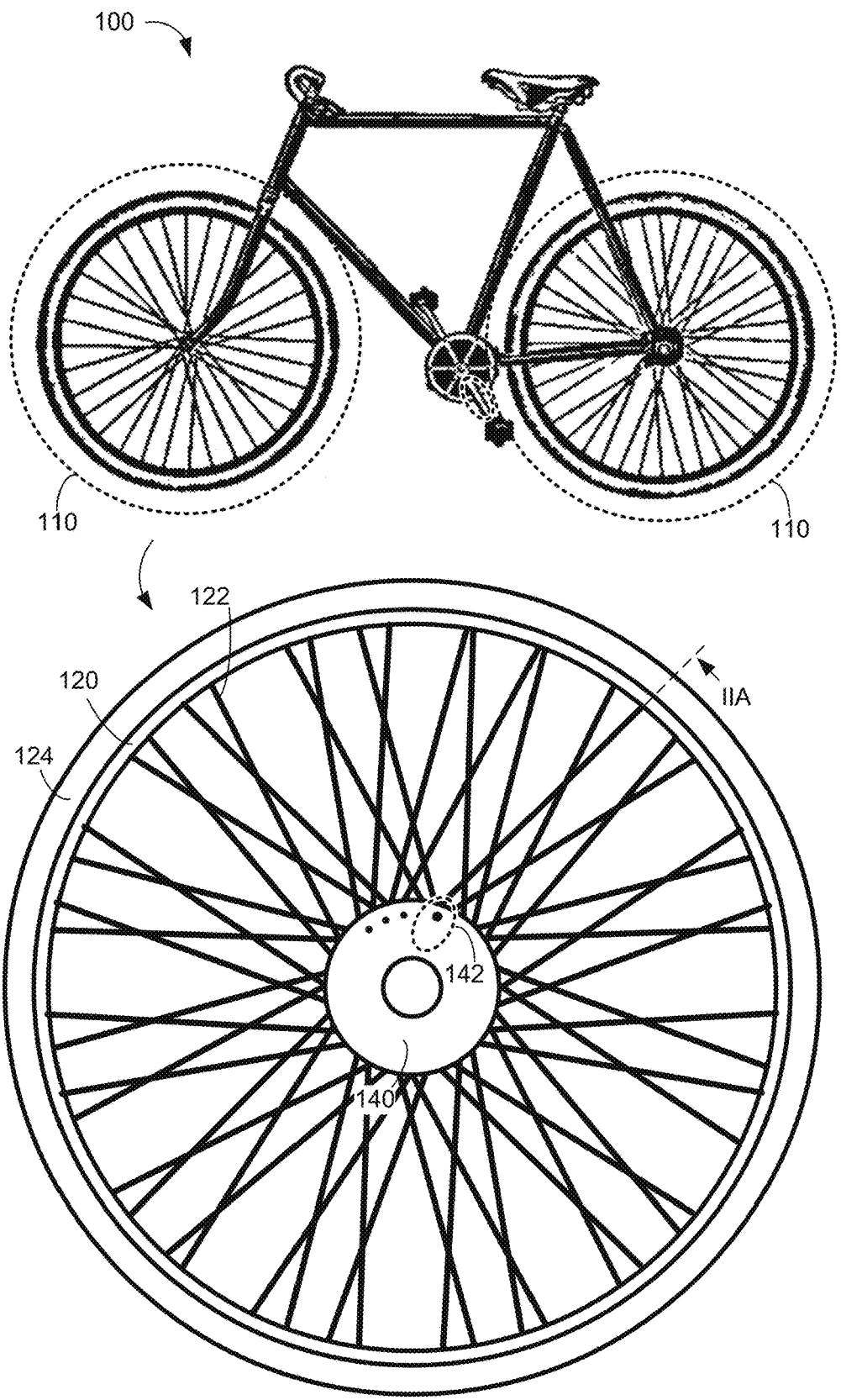
FIG. 1 is a schematic diagram illustrating parts of a bicycle in accordance with some embodiments.

FIG. 1 is a schematic diagram illustrating parts of a bicycle 100 (also called herein a vehicle) in accordance with some embodiments. Although the bicycle 100 is used as an example throughout this application, the piezoelectric devices described herein may be used in other vehicles, such as an automobile, any other automotive vehicles, or any personal transportation vessels or vehicles.

The bicycle 100 includes a frame and one or more wheels 110 (e.g., in FIG. 1, the bicycle 100 includes two wheels 110).

The wheel 110 includes a rim 120 and a tire 124 mounted on the rim 120. The rim 120 is coupled with a plurality of spokes 122, which extend to a hub 140 of the wheel 110. In some embodiments, the spokes 122 are coupled to hub holes 142 (also called spoke holes) of the hub 140 (e.g., using a hub hook).

Figure 2A:
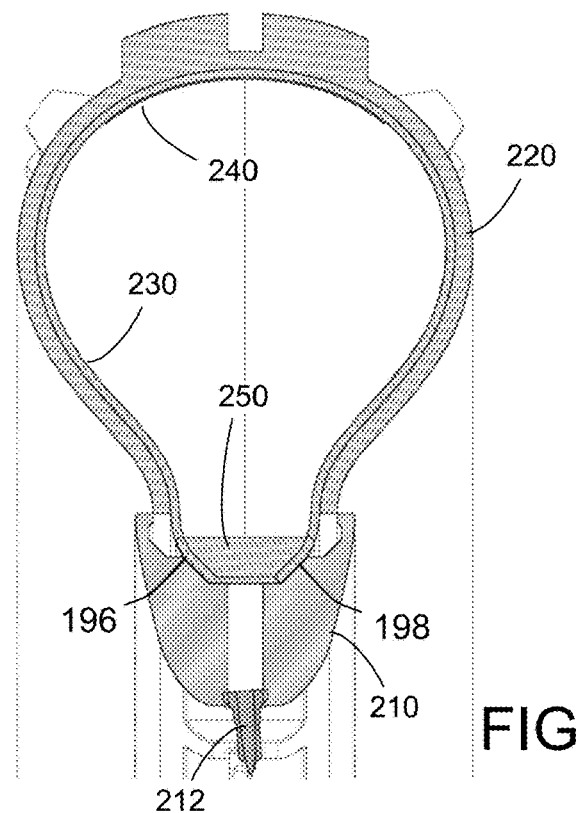
FIG. 2A is a cross-sectional view of a wheel in accordance with some embodiments.

A cross-sectional view of a wheel (e.g., a bicycle wheel) is shown in FIG. 2A. In some embodiments, the wheel shown in FIG. 2A corresponds to the wheel 110 shown in FIG. 1.

FIG. 2A shows a rim 210 on which a tire 220 and a sensor module are mounted. The sensor module shown in FIG. 2A includes an elastic support 230 and a piezoelectric sensor 240 coupled (e.g., mounted) on the elastic support 230. The sensor module shown in FIG. 2A also includes a base 250.

In some embodiments, the piezoelectric sensor 240 includes a thin layer of a piezoelectrical material. Examples of piezoelectric materials include gallium nitride, indium nitride, aluminum nitride, zinc oxide, barium titanate, lead zirconate titanate, potassium niobate, sodium tungstate, $Ba_2NaNb_5O_5$, $Pb_2KNb_5O_5$, single crystalline zinc oxide, langasite, gallium orthophosphate, lithium niobate, lithium tantalite, sodium potassium niobate, bismuth ferrite, sodium niobate, bismuth titanate, sodium bismuth titanate, quartz, berlinite, topaz, lead titanate, and piezoelectric polymers, such as polyvinylidene fluoride, polyamides, paralyne-C, polyimide, and polyvinylidene chloride. Piezoelectric materials are capable of generating electrical charge in response to applied mechanical stress. Thus, when the piezoelectric sensor 240 bends, the piezoelectric material provides charges that are indicative of the amplitude of how much the piezoelectric sensor 240 is bent (e.g., a displacement of a free end of the piezoelectric sensor 240). Similarly, when the piezoelectric sensor 240 vibrates, the piezoelectric material in the piezoelectric sensor 240 provides an (oscillating) electrical signal that corresponds to the vibration of the piezoelectric sensor 240.

The length, width, and thickness of the piezoelectric sensor 240 are selected to obtain a desired performance for sensing or energy harvesting applications. In some embodiments, for use with a bicycle wheel, the length may be selected between 1 mm and 30 mm, between 1 mm and 10 mm, between 5 mm and 15 mm, between 10 mm and 20 mm, between 15 mm and 25 mm, between 20 mm and 30 mm, between 1 mm and 5 mm, between 5 mm and 10 mm, between 10 mm and 15 mm, between 15 mm and 20 mm, between 20 mm and 25 mm, between 25 mm and 30 mm, between 1 mm and 3 mm, between 2 mm and 4 mm, between 3 mm and 5 mm, between 4 mm and 6 mm, between 5 mm and 7 mm, between 6 mm and 8 mm, between 7 mm and 9 mm, or between 8 mm and 10 mm. In some embodiments, for use with a bicycle wheel, the length is approximately 1 mm, approximately 2 mm, approximately 3 mm, approximately 4 mm, approximately 5 mm, approximately 6 mm, approximately 7 mm, approximately 8 mm, approximately 9 mm, approximately 10 mm, approximately 15 mm, approximately 20 mm, approximately 25 mm, or approximately 30 mm. In some embodiments, for use with a bicycle wheel, the width is selected between 1 mm and 10 mm, between 5 mm and 15 mm, between 10 mm and 20 mm, between 1 mm and 5 mm, between 5 mm and 10 mm, between 10 mm and 15 mm, between 15 mm and 20 mm, between 1 mm and 4 mm, between 2 mm and 5 mm, between 3 mm and 6 mm, between 4 mm and 7 mm, between 5 mm and 8 mm, between 6 mm and 9 mm, or between 7 mm and 10 mm. In some embodiments, for use with a bicycle wheel, the width is approximately 1 mm, approximately 2 mm, approximately 3 mm, approximately 4 mm, approximately 5 mm, approximately 6 mm, approximately 7 mm, approximately 8 mm, approximately 9 mm, approximately 10 mm, approximately 15 mm, or approximately 20 mm. In some embodiments, for use with a bicycle wheel, the thickness of the piezoelectric sensor 240 is 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1 mm, 2 mm, 3 mm, 4 mm, 5 mm, or within a range between any two of the aforementioned values. In some embodiments, the thickness of the piezoelectric sensor 240 is approximately 100 μm, approximately 200 μm, approximately 300 μm, approximately 400 μm, approximately 500 μm, approximately 600 μm, approximately 1 mm, approximately 2 mm, approximately 3 mm, approximately 4 mm, or approximately 5 mm. For wheels of different sizes, the piezoelectric sensor may have any other length, width, and thickness.

In some embodiments, the piezoelectric sensor 240 includes a single layer of piezoelectric material. In some embodiments, the piezoelectric sensor 240 includes two or more layers of piezoelectric material. In some embodiments, the two or more layers of piezoelectric material are separated by one or more interleaving layers of an insulating material or a conductive material.

In some embodiments, the piezoelectric sensor 240 is electrically coupled to an electrical circuit (e.g., an electrical circuit in the base 250) for providing electrical signals to an electrical circuit. One or more electrical wires may be used for electrically coupling the piezoelectric sensor 240 to the electrical circuit. Such electrical wires are not shown in FIGS. 2A-2C so as not to obscure other aspects of the sensor module.

The elastic support is made of an elastic material. In some embodiments, the elastic support includes steel (e.g., carbon steel and spring steel), titanium, or a composite material (e.g., carbon composite, such as carbon-fiber-reinforced polymers).

In some embodiments, the elastic material has an elasticity so that the shape (or a curvature) of the elastic support 230 is defined by the tire 220 when the sensor module and the tire 220 are mounted on the rim 210. For example, the elastic support 230 may have a shape that corresponds to the shape of the internal surface of the tire 220.

The length, width, and thickness of the elastic support 230 are selected to obtain desired overloading protection to the piezoelectric sensor 240. In some embodiments, the elastic support 230 has a shape of a strip. In some embodiments, the elastic support 230 has a width that matches the width of the piezoelectric sensor 240. In some embodiments, the elastic support 230 has a width that is greater than the width of the piezoelectric sensor 240. In some embodiments, the length of the elastic support 230 is selected so that the elastic support 230 substantially fills an inner circumference of the tire 240 (e.g., the length of the elastic support 230 is equal to, or greater than the inner circumference of the tire 240). In some embodiments, the length of the elastic support 230 is selected so that the elastic support 230 contacts one or more portions of an inner surface of the tire 240 but does not substantially fill the inner circumference of the tire 240.

The elastic support 230 has two ends: first end 196 and second end 198, which may be coupled to the base 250.

In some embodiments, the base 250 includes an energy storage device (e.g., a battery or a capacitor). In some embodiments, the base 250 includes electrical circuit for energy harvesting from the electrical signals provided by the piezoelectric sensor 240.

In some embodiments, the base 250 includes electrical circuit for analyzing electrical signals from the piezoelectric sensor 240. For example, the base 250 may include one or more processors (e.g., microprocessors). In some embodiments, the one or more processors receive electrical power from the piezoelectric sensor 240 for operation of the one or more processors. In some embodiments, the one or more processors (also) receive electrical power from the energy storage device. In some embodiments, the one or more processors analyze the received electrical signals (e.g., for determining forces on the tire, movement of the vehicle, and/or the road condition).

In some embodiments, the base 250 also includes one or more communication interfaces (e.g., wired communication circuit and/or wireless communication circuit) for transmitting the electrical signals from the piezoelectric sensor 240 and/or information obtained by analyzing the electrical signals to another wireless communication circuit located in another part of the wheel or away from the wheel.

FIG. 2A also shows that, in some embodiments, the rim 210 includes, or is coupled to, a spoke coupler 212 (e.g., a threaded coupler) for coupling with a spoke.

Figure 2B:
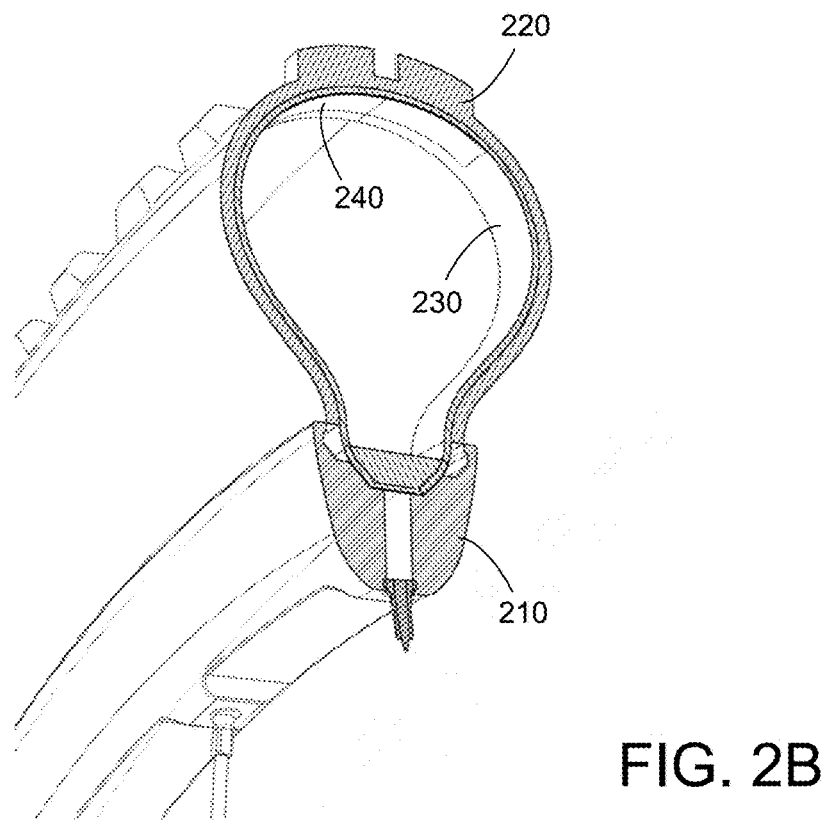
FIG. 2B is a sectional view of the wheel shown in FIG. 2A in accordance with some embodiments.

FIG. 2B is a sectional view of the wheel shown in FIG. 2A in accordance with some embodiments.

Figure 2C:
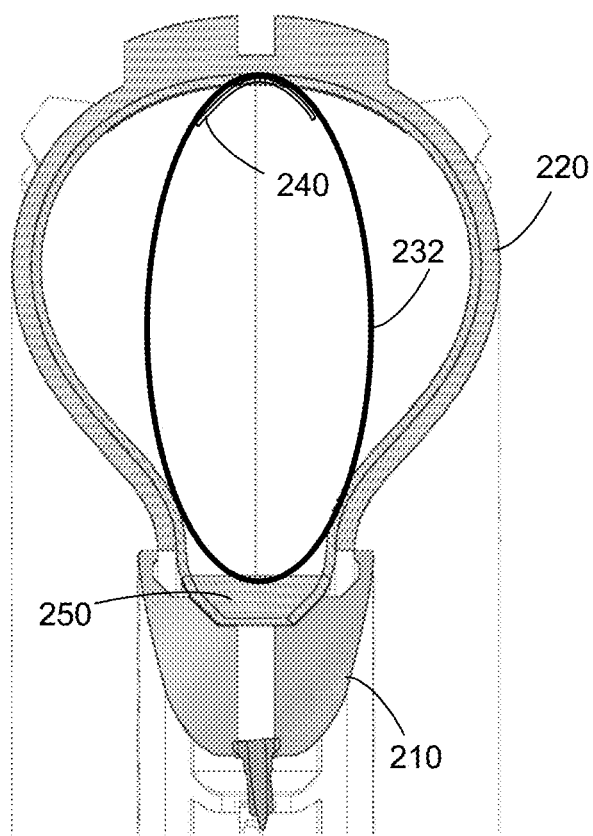
FIG. 2C is a cross-sectional view of a wheel in accordance with some embodiments.

FIG. 2C is a cross-sectional view of a wheel in accordance with some embodiments. The cross section shown in FIG. 2C is similar to the cross-section shown in FIG. 2A, except that in FIG. 2C, the sensor module includes an elastic support 232 instead of the elastic support 230 shown in FIG. 2A. The elastic support 232 is sized and shaped so that the elastic support 232 does not fill the inner surface of the tire 220. This allows the elastic support 232 to have a line contact with the tire 220 instead of a planar contact. In addition, the elastic support 232 has a shape of a loop or a hoop in the cross section (which corresponds to a shape of a tube in the three dimension).

Figure 3:
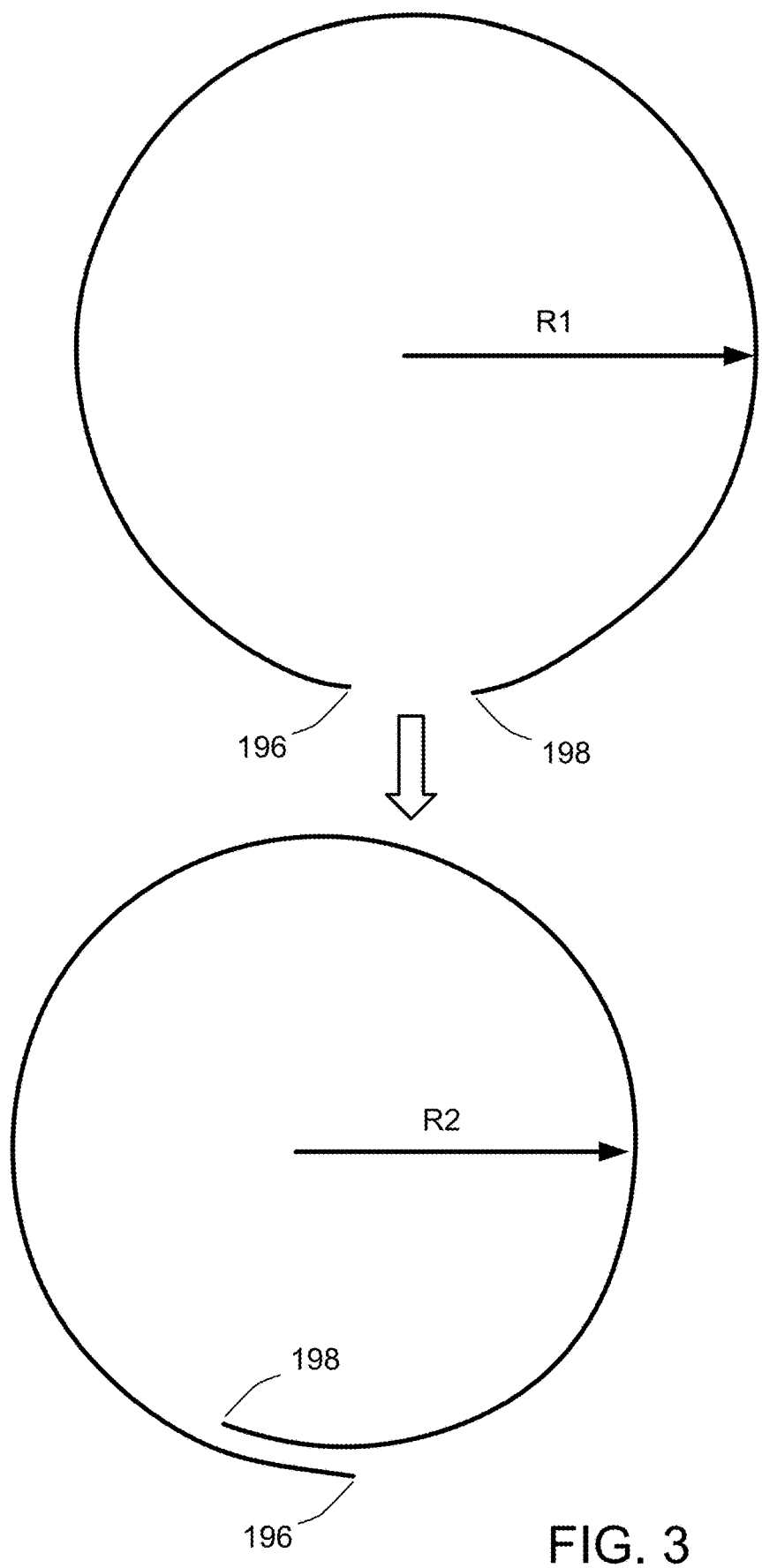
FIG. 3 is a schematic diagram illustrating deformation of an elastic support and a piezoelectric sensor mounted thereon in accordance with some embodiments.

FIG. 3 is a schematic diagram illustrating deformation of an elastic support and a piezoelectric sensor mounted thereon in accordance with some embodiments.

FIG. 3 shows an elastic support with two ends: first end 196 and second end 198. In some embodiments, the first end 196 is rigidly fixed. For example, the first end 196 may be rigidly coupled with a base so that there is no relative movement between the first end 196 and the base. In some embodiments, the first end 196 is rotatably fixed. For example, the first end 196 may be rotatably coupled with the base so that the first end 196 may rotate relatively to the base but not laterally relative to the base. In some embodiments, the second end 198 is rigidly fixed. For example, the second end 198 may be rigidly coupled with a base so that there is no relative movement between the second end 198 and the base. In some embodiments, the second end 198 is rotatably fixed. For example, the second end 198 may be rotatably coupled with the base so that the second end 198 may rotate relatively to the base but not laterally relative to the base. In some embodiments, the second end 198 is movably (e.g., slidably) coupled with the base. This allows the second end 198 to move relatively to the base (e.g., slide along a top surface of, or a track defined in, the base). In some embodiments, the second end 198 is not coupled with the base. This allows the second end 198 to move freely (within the confinement of the tire). In some embodiments, the second end 198 is releasably coupled with the base. In some embodiments, the first end 196 is also releasably coupled with the base.

The top portion of FIG. 3 shows that the elastic support has a radius of R1 at a first time (e.g., when no external force is applied on the tire), and the bottom portion of FIG. 3 shows that the elastic support has a radius of R2, which is less than R1, at a second time (e.g., when an external force is applied on the tire, which is, in turn, applied on the elastic support). This reduction in the radius of curvature of the elastic support also causes the bending of the piezoelectric sensor mounted on the elastic support, thereby causing generation of electrical signals. Thus, the electrical signals generated by the piezoelectrical sensor can indicate the application of an external force on the tire and the corresponding deformation of the tire, the elastic support, and the piezoelectric sensor.

Figure 4A:
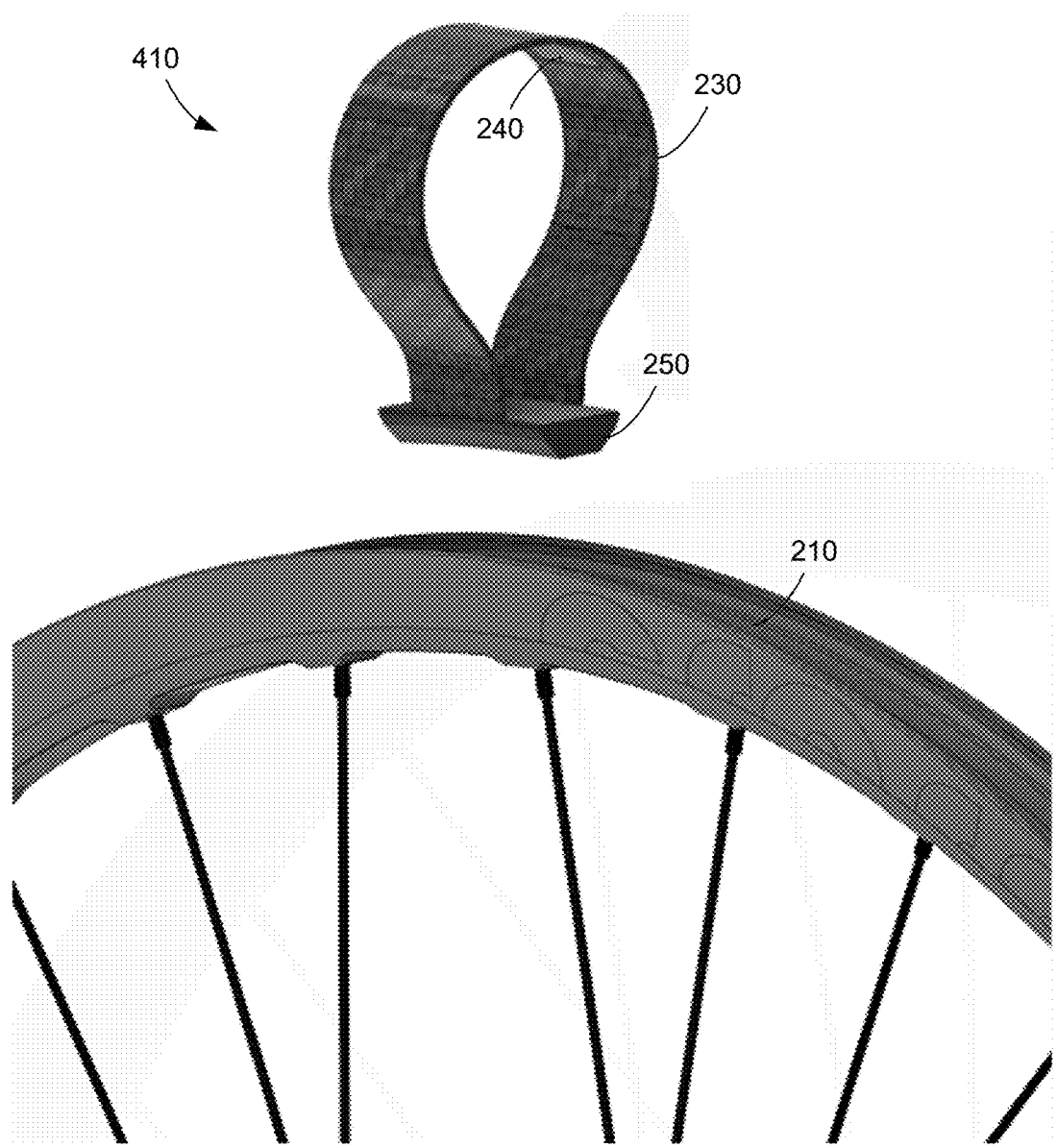
FIGS. 4A and 4B illustrate mounting of a sensor module on a rim of a wheel in accordance with some embodiments.
Figure 4B:
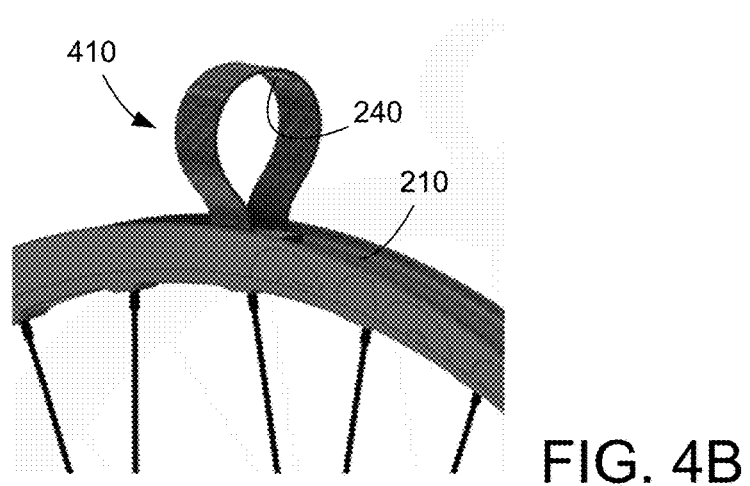

FIGS. 4A and 4B illustrate mounting of a sensor module on a rim of a wheel in accordance with some embodiments.

FIG. 4A shows a sensor module 410 with the elastic support 230 and the piezoelectric sensor 240 mounted on the base 250. The base 250 of the sensor module 410 may be shaped to mate with the rim 210 of the wheel so that the sensor module 410 may be mounted directly onto the rim 210 as shown in FIG. 4B.

Figure 5:
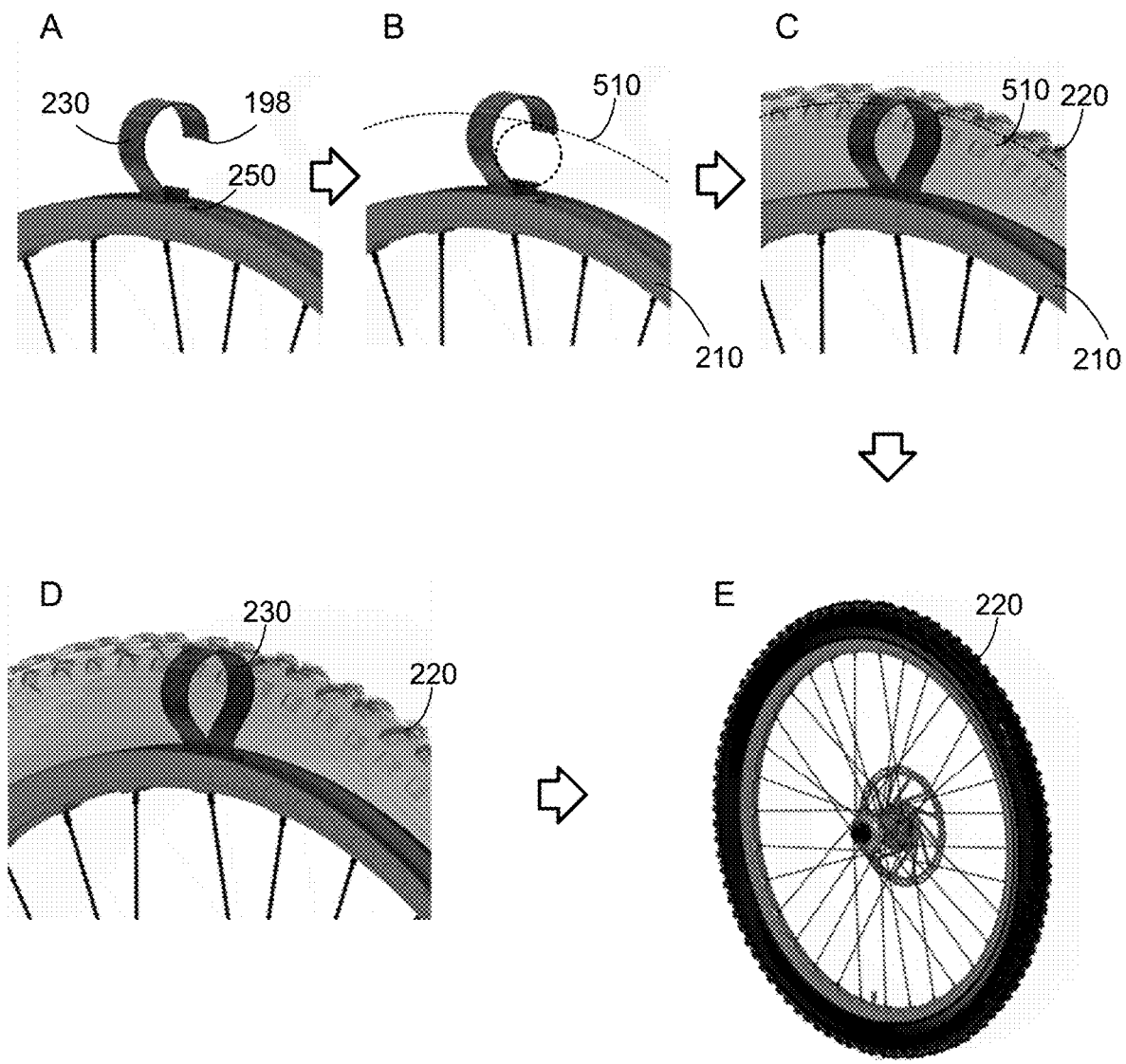
FIG. 5 illustrates mounting of a tire with a tube and a tubeless tire on a wheel for in accordance with some embodiments.

FIG. 5 illustrates mounting of a tire with a tube and a tubeless tire on a wheel for in accordance with some embodiments.

For mounting a tire with a tube, one end (e.g., the second end 198) of the elastic support 230 is released from the base 250 (or alternatively, at least one end of the elastic support is free—not coupled to the base at all), as shown in section A of FIG. 5. Subsequently, a tube 510 is placed around the rim 210 and the elastic support 230 at least partially encircles the tube 510, as shown in section B of FIG. 5. In some configurations, this allows the piezoelectric sensor on an inner surface of the elastic support 230 to come into contact with the tube 510. In some implementations, the one end (e.g., the second end 198) of the elastic support 230 is coupled to the base 250. A tire 220 is mounted on the rim 210 over the tube 510 and the elastic support 230, as shown in section C of FIG. 5. The bead of the tire 220 is seated and the tube 510 is inflated so that the wheel is may be used for driving a vehicle.

For mounting a tubeless tire, the tire 220 is mounted directly over the elastic support 230, as shown in section D of FIG. 5. The bead of the tire 220 is seated and the tube 510 is inflated so that the wheel is may be used for driving a vehicle.

Figure 6:
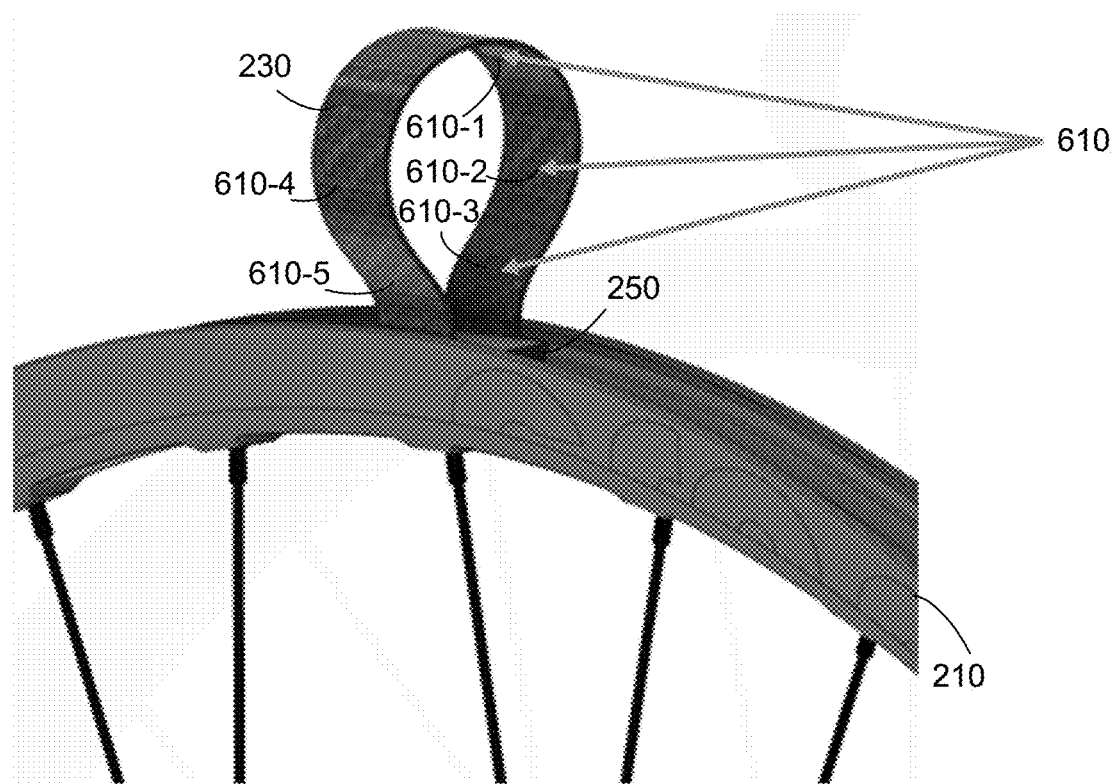
FIG. 6 illustrates example locations for mounting piezoelectric sensors in accordance with some embodiments.

FIG. 6 illustrates example locations for mounting piezoelectric sensors in accordance with some embodiments. As shown in FIG. 6, piezoelectric sensors may be located on an inner surface of the elastic support 230 (e.g., a surface opposite to an outer surface facing the tire). In some embodiments, a piezoelectric sensor is located away from the base 250 (or the rim 210)(e.g., the piezoelectric sensor is located adjacent to an apex 610-1 of an internal surface of the elastic support 230). In some embodiments, a piezoelectric sensor is located adjacent to the base 250 (or the rim 210)(e.g., at location 610-3 or 610-5). In some embodiments, a piezoelectric sensor is located laterally (e.g., at location 610-2). In some embodiments, only one piezoelectric sensor is coupled on the elastic support 230. In some embodiments, two or more piezoelectric sensors are coupled on the elastic support 230. For example, in some configurations, a first piezoelectric sensor is located at location 610-1 and a second piezo-electric sensor is located at location 610-3. In some configurations, a first piezoelectric sensor is located at a lateral location 610-2 and a second piezo-electric sensor is located at an opposite lateral location 610-4 (on an inside surface of the elastic support 230 or an external surface of the elastic support 230). In some configurations, three piezoelectric sensors are located at locations 610-1, 610-2, and 610-3, or at locations 610-1, 610-2, and 610-4, or at locations 610-2, 610-3, and 610-4, or at any other locations. In some configurations, four piezoelectric sensors are located at locations 610-1, 610-2, 610-3, and 610-4. In some configurations, five or more piezoelectric sensors are coupled on the elastic support 230 (e.g., at locations 610-1 through 610-5). In some configurations, at least some piezoelectric sensors are located on the outer surface of the elastic support 230 (e.g., location 610-5 may be on the outer surface of the elastic support 230).

FIGS. 7A-7E illustrate example configurations of a wheel with one or more sensor modules in accordance with some embodiments.

Figure 7A:
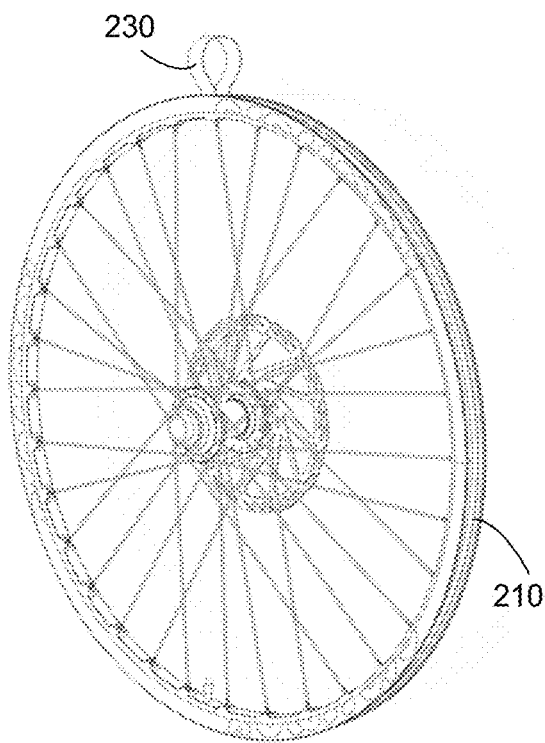
FIGS. 7A-7E illustrate example configurations of a wheel with one or more sensor modules in accordance with some embodiments.

FIG. 7A shows a configuration in which a single elastic support 230 (of a single sensor module) is mounted on the rim.

Figures 7B, 7C:
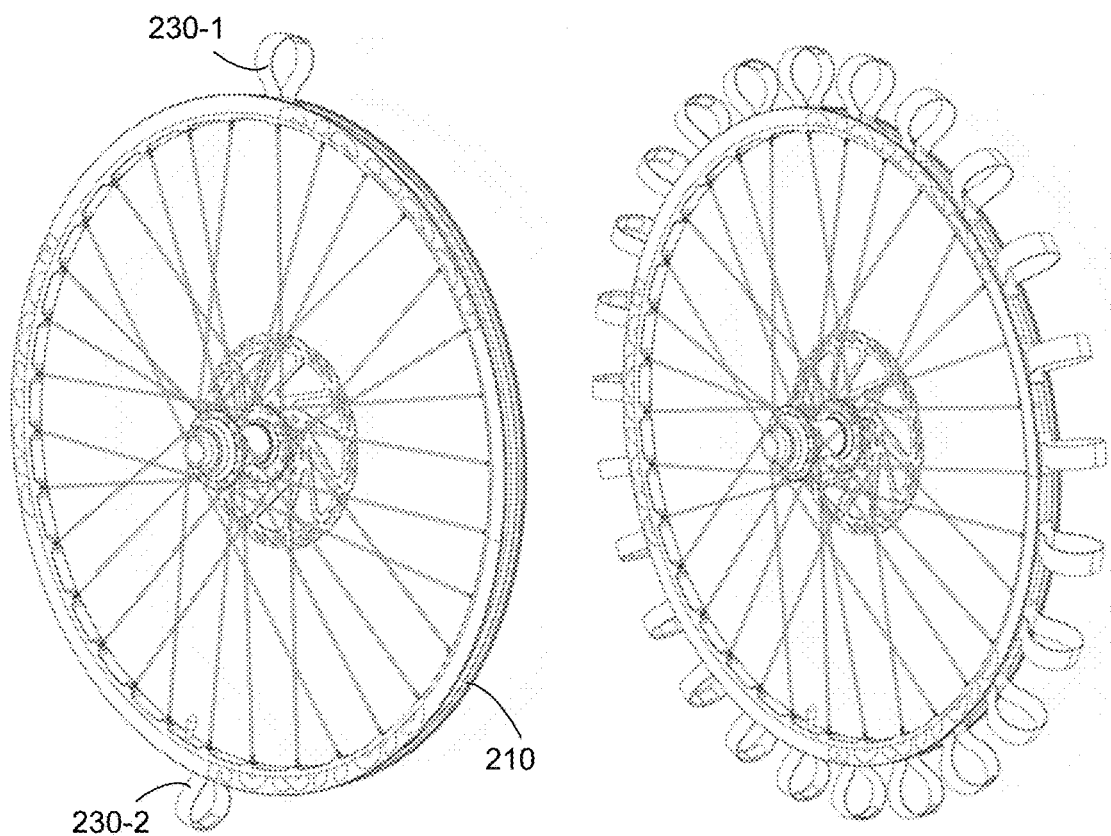

FIG. 7B shows a configuration in which two elastic supports 230-1 and 230-2 are mounted on the rim. In some configurations, the two elastic supports 230-1 and 230-2 are mounted on a single base. In some configurations, the two elastic supports 230-1 and 230-2 are mounted on separate bases (e.g., the elastic support 230-1 is mounted on a first base and the elastic support 230-1 is mounted on a second base that is distinct and separate from the first base).

FIG. 7C shows a configuration in which more than twenty (e.g., twenty-five) elastic supports are mounted on the rim. In some configurations, the more than twenty elastic supports are mounted on a single base. In some configurations, the more than twenty elastic supports are mounted on two or more bases. In some configurations, each elastic support of the more than twenty elastic supports is mounted on a respective base (e.g., twenty-five bases for twenty-five elastic supports).

Figure 7D:
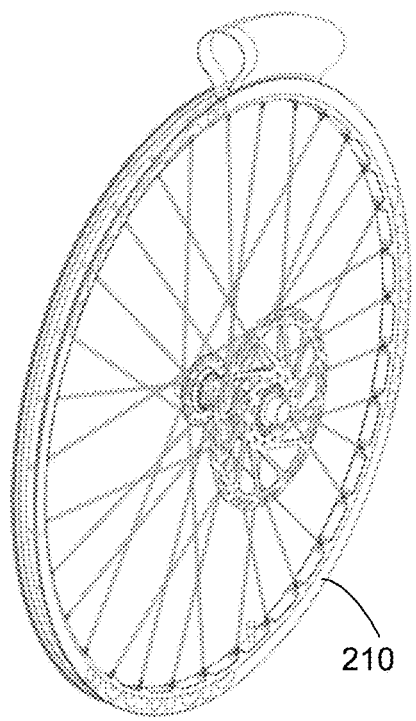
Figure 7E:
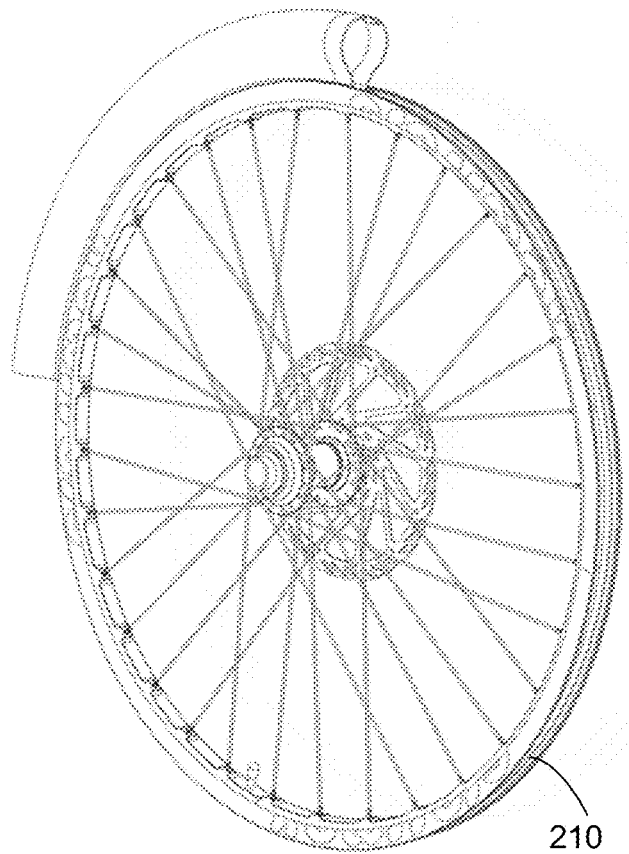

FIGS. 7A-7C show elastic supports that extend radially by less than five degrees, four degrees, three degrees, two degrees, or one degree. In some embodiments, an elastic support may extend radially by more than five degrees (e.g., six degrees, seven degrees, eight degrees, nine degrees, ten degrees, fifteen degrees, twenty degrees, thirty degrees, forty degrees, forty-five degrees, sixty degrees, ninety degrees, or more). For example, FIG. 7D shows an elastic support that extends radially by between ten and twenty degrees and FIG. 7E shows an elastic support that extends radially by ninety degrees. Although FIGS. 7D and 7E show single elastic supports, in some configurations, two or more elastic supports may be used as shown in FIGS. 7B and 7C.

Figure 8A:
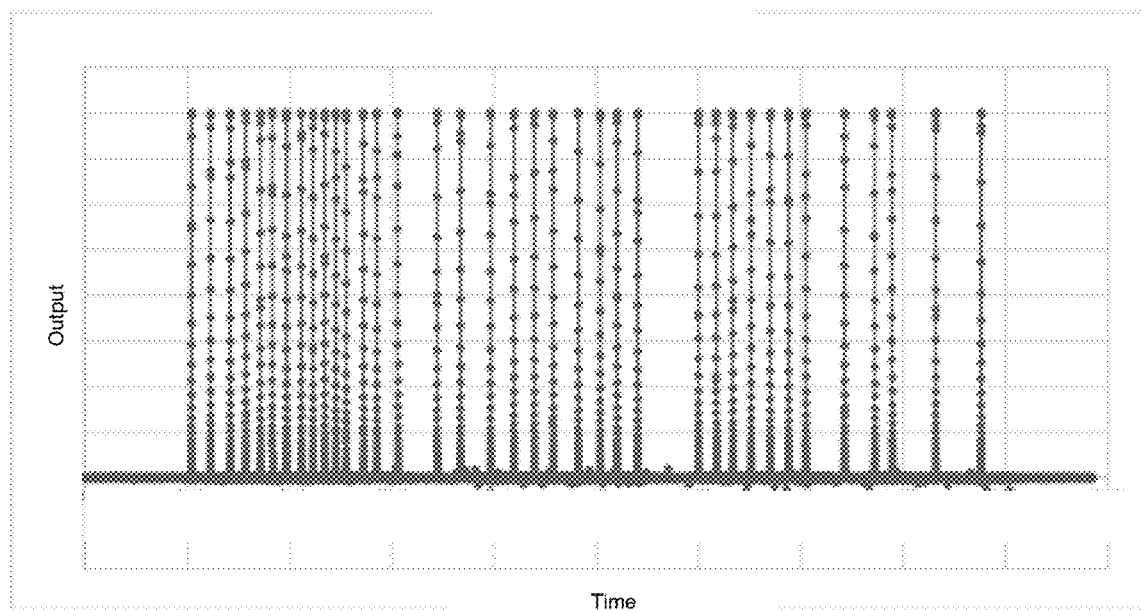
FIG. 8A is a plot showing a pulse frequency generated based on electrical signals from a piezoelectric sensor in accordance with some embodiments.
Figure 8B:
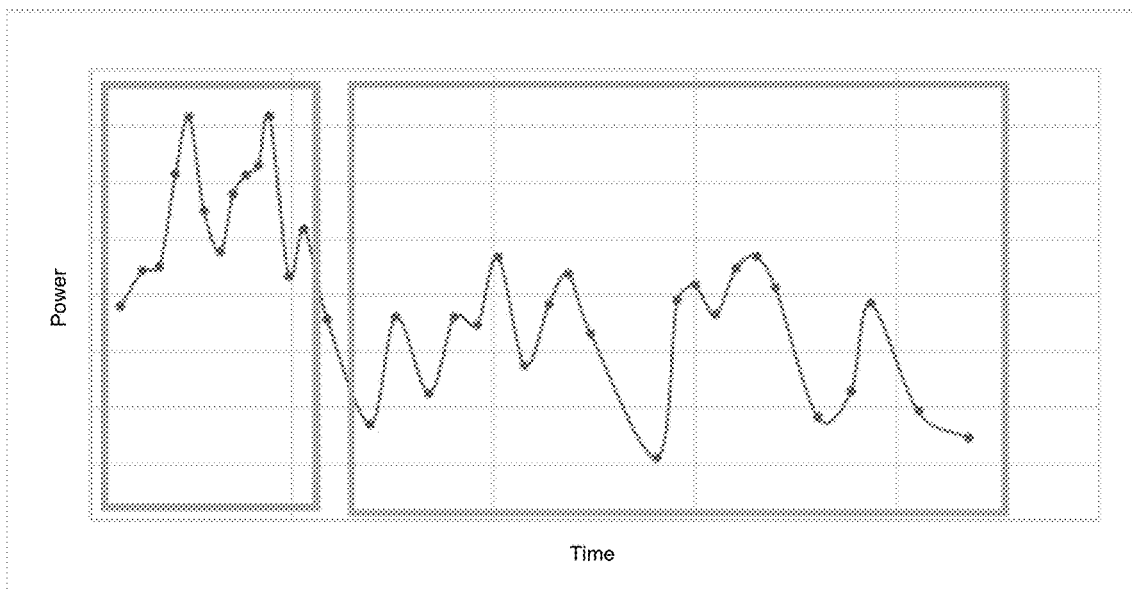
FIG. 8B is a plot showing electrical power generated by a piezoelectric sensor in accordance with some embodiments.

FIG. 8A is a plot showing a pulse frequency generated based on electrical signals obtained from a road test using a piezoelectric sensor mounted on a bicycle wheel in accordance with some embodiments. FIG. 8B is a plot showing electrical power generated by a piezoelectric sensor in accordance with some embodiments. FIG. 8B shows the difference in the electrical power generated by the sensor module at a high speed of travel (left box) and at a low speed of travel (right box). Thus, the sensor module described herein has provided both information associated with the driving condition (e.g., pulse frequency) and electrical power.

FIG. 9 is a flow diagram illustrating a method 900 of generating electrical signals with one or more piezoelectric sensors coupled on an elastic support, in accordance with some embodiments.

The method 900 includes (910) receiving a force on a tire (e.g., tire 220 in FIG. 5) mounted on a rim (e.g., rim 210 in FIG. 5) of a wheel. The tire is in contact with an elastic support (e.g., section C or D of FIG. 5) with one or more piezoelectric sensors coupled thereon so that the force causes strain in the elastic support and the one or more piezoelectrical sensors (e.g., FIG. 3); and, (920) in response to receiving the force, generating electrical signals from the one or more piezoelectric sensors.

In some embodiments, the method 900 includes (930) determining a driving condition of the wheel based on the electrical signals generated from the one or more piezoelectric sensors (e.g., the pulse frequency may be obtained from the electrical signals).

In light of these examples and principles explained herein, we now turn to certain embodiments.

In accordance with some embodiments, a sensor module mountable adjacent to a rim of a wheel includes a first set of one or more piezoelectric sensors (e.g., piezoelectric sensor 240 in FIG. 4A); and a first elastic support (e.g., elastic support 230 in FIG. 4A) with the first set of one or more piezoelectric sensors coupled thereon so that the first set of one or more piezoelectric sensors are spaced apart from the rim of the wheel (e.g., in FIG. 4B, the piezoelectric sensor is not in contact with, and is spaced apart from, the rim 210).

In some embodiments, the first elastic support has a cross-section (e.g., a radial cross-section that is perpendicular to an axis defined by a portion of the rim where the sensor module is mounted as shown in FIG. 2A, and not a cross-section that is perpendicular to an axis of the wheel) that includes at least a partially closed curve (e.g., the first elastic support has a shape of a partially-open tube). For example, the first elastic support may have the second end 198 that is not in contact with the first end 196 as shown in the top portion of FIG. 3.

In some embodiments, the cross-section includes a fully enclosed curve (e.g., both ends of the first elastic support meet with, or overlap, each other, or the first elastic support has a shape of a loop or a hoop as shown in FIG. 2C).

In some embodiments, the sensor module includes a base (e.g., the base 250 in FIG. 4A) onto which the first elastic support is coupled.

In some embodiments, the first elastic support has a first end and a second end that is opposite to the first end (e.g., the first end 196 and the second end 198), and the first end is rigidly coupled with the base (e.g., in FIG. 2A, the first end 196 may be rigidly coupled to the base 250).

In some embodiments, the first elastic support has a first end and a second end that is opposite to the first end; and the first end is rotatably coupled with the base (e.g., in FIG. 2A, the first end 196 may be rotatably coupled to the base 250 so that the first end 196 does not slide relative to the base 250 but may rotate along the contact between the first end 196 and the base 250).

In some embodiments, the second end is rigidly coupled with the base. In some embodiments, the second end is movably coupled with the base. In some embodiments, the second end is not coupled with the base.

In some embodiments, the base includes electrical circuit electrically coupled with the first set of one or more piezoelectric sensors.

In some embodiments, the first elastic support includes an inner surface and an outer surface that is opposite to the inner surface; and the first set of one or more piezoelectric sensors include at least one piezoelectric sensor mounted on the inner surface (e.g., see FIG. 6).

In some embodiments, the sensor module includes a second set of one or more piezoelectric sensors; and a second elastic support with the second set of one or more piezoelectric sensors coupled thereon so that the second set of one or more piezoelectric sensors are spaced apart from the rim of the wheel (e.g., see FIG. 7B).

In accordance with some embodiments, a wheel includes a rim and any sensor module described herein (e.g., see FIG. 4B).

In some embodiments, the wheel includes a tire mounted on the rim (e.g., see FIG. 5).

In some embodiments, the first elastic support of the sensor module has a point or line contact with the tire (e.g., see FIG. 2C).

In some embodiments, the first elastic support of the sensor module has a plane contact with the first elastic support (e.g., see FIG. 2A).

In some embodiments, the wheel includes a tube. The first elastic support substantially encircles the tube (e.g., see section C of FIG. 5).

In some embodiments, the first set of one or more piezoelectric sensors includes at least one piezoelectric sensor in contact with the tube (e.g., see section C of FIG. 5).

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles of the various described embodiments and their practical applications, to thereby enable others skilled in the art to best utilize the principles and the various described embodiments with various modifications as are suited to the particular use contemplated.

What is claimed is:

1. A sensor module mountable to a rim of a wheel, the sensor module comprising:
   a first set of one or more piezoelectric sensors;
   a first elastic support with the first set of one or more piezoelectric sensors coupled thereon, wherein the first set of one or more piezoelectric sensors are coupled to a first surface of the first elastic support; and
   a base onto which the first elastic support is coupled, the base configured to mount to the rim of the wheel,
   wherein the first elastic support extends from the base in an arc shape such that a second surface of the first elastic support contacts an inner surface of a tire while the sensor module and the tire are mounted to the rim of the wheel, wherein the second surface is opposite the first surface, and
   wherein the first elastic support is configured to transfer mechanical strain from the tire to the set of piezoelectric sensors, the mechanical strain caused by deformation of the tire during operation of the wheel.

2. The sensor module of claim 1, wherein:
   the first elastic support has a cross-section that includes at least a partially closed curve.

3. The sensor module of claim 2, wherein:
   the cross-section includes a fully enclosed curve.

4. The sensor module of claim 1, wherein:
   the first elastic support has a first end and a second end that is opposite to the first end; and
   the first end is rigidly coupled with the base.

5. The sensor module of claim 4, wherein:
   the second end is rigidly coupled with the base.

6. The sensor module of claim 4, wherein:
   the second end is movably coupled with the base.

7. The sensor module of claim 4, wherein:
   the second end is not coupled with the base.

8. The sensor module of claim 1, wherein the base includes electrical circuit electrically coupled with the first set of one or more piezoelectric sensors.

9. The sensor module of claim 1, further comprising:
   a second set of one or more piezoelectric sensors; and
   a second elastic support with the second set of one or more piezoelectric sensors coupled thereon so that the second set of one or more piezoelectric sensors are spaced apart from the rim of the wheel.

10. The sensor module of claim 1, wherein the wheel is a component of a bicycle.

11. The sensor module of claim 1, wherein the first set of one or more piezoelectric sensors comprise a first piezoelectric sensor located adjacent to an apex of the first elastic support.

12. The sensor module of claim 1, wherein the base is shaped to mate with the rim of the wheel.

13. A wheel, comprising:
   a rim; and
   a sensor module mountable to the rim, the sensor module comprising:
      a first set of one or more piezoelectric sensors;
      a first elastic support with the first set of one or more piezoelectric sensors coupled thereon, wherein the first set of one or more piezoelectric sensors are coupled to a first surface of the first elastic support; and
      a base component onto which the first elastic support is coupled, the base component configured to mount to the rim of the wheel,
      wherein the first elastic support extends from the base component in an arc shape such that a second surface of the first elastic support contacts an inner surface of a tire while the sensor module and the tire are mounted to the rim of the wheel, wherein the second surface is opposite the first surface, and wherein the first elastic support is configured to transfer mechanical strain from the tire to the set of piezoelectric sensors, the mechanical strain caused by deformation of the tire during operation of the wheel.

14. The wheel of claim 13, further comprising:
the tire mounted on the rim.

15. The wheel of claim 14, wherein:
the first elastic support of the sensor module has a point or line contact with the tire.

16. The wheel of claim 14, wherein:
the first elastic support of the sensor module has a plane contact with the tire.

17. The wheel of claim 14, further comprising:
a tube, wherein the first elastic support substantially encircles the tube.

18. A method, comprising:
mounting a sensor module to a rim of a wheel, wherein the sensor module comprises:
   a set of one or more piezoelectric sensors,
   an elastic support with the set of one or more piezoelectric sensors coupled thereon, wherein the set of one or more piezoelectric sensors are coupled to a first surface of the elastic support, and
   a base component onto which the elastic support is coupled, the base component configured to mount to the rim of the wheel, wherein the elastic support extends from the base component in an arc shape such that a second surface of the first elastic support contacts an inner surface of a tire while the sensor module and the tire are mounted to the rim of the wheel, wherein the second surface is opposite the first surface;
receiving a force on the tire mounted on the rim of the wheel, wherein the force causes deformation of the tire, and the deformation causes strain in the elastic support, which is transferred to the one or more piezoelectrical sensors; and
in response to receiving the force, generating electrical signals from the one or more piezoelectric sensors.

19. The method of claim 18, further comprising:
determining a driving condition of the wheel based on the electrical signals generated from the one or more piezoelectric sensors.

* * * * *